United States Patent

Ward

Patent Number: 5,167,119
Date of Patent: Dec. 1, 1992

[54] GAS TURBINE ENGINE THRUST REVERSER CONTROL

[75] Inventor: Andrew G. Ward, Derby, England

[73] Assignee: Rolls-Royce plc, London, England

[21] Appl. No.: 717,488

[22] Filed: Jun. 19, 1991

[30] Foreign Application Priority Data

Jul. 12, 1990 [GB] United Kingdom ............... 9015373

[51] Int. Cl.$^5$ ............................................. F02K 1/32
[52] U.S. Cl. ............................... 60/226.1; 60/39.091; 60/226.2; 244/110 B
[58] Field of Search ............... 60/226.2, 230, 223, 60/39.091, 226.1; 244/110 B

[56] References Cited

U.S. PATENT DOCUMENTS 3,040,524 6/1962 Kurti ................................ 60/226.2
4,424,669 1/1984 Fage ...................................... 60/230

Primary Examiner—Richard A. Bertsch
Assistant Examiner—Laleh Jalali
Attorney, Agent, or Firm—Cushman, Darby & Cushman

[57] ABSTRACT

A gas turbine engine is provided with a thrust reverser. In order to avoid inadvertent operation of the thrust reverser when the gas turbine engine is not running, a safety switch is provided on the engine at a position remote from the thrust reverser. The thrust reverser control system is arranged so that when the engine is not running the thrust reverser will only operate when the safety switch is being manually operated.

5 Claims, 2 Drawing Sheets

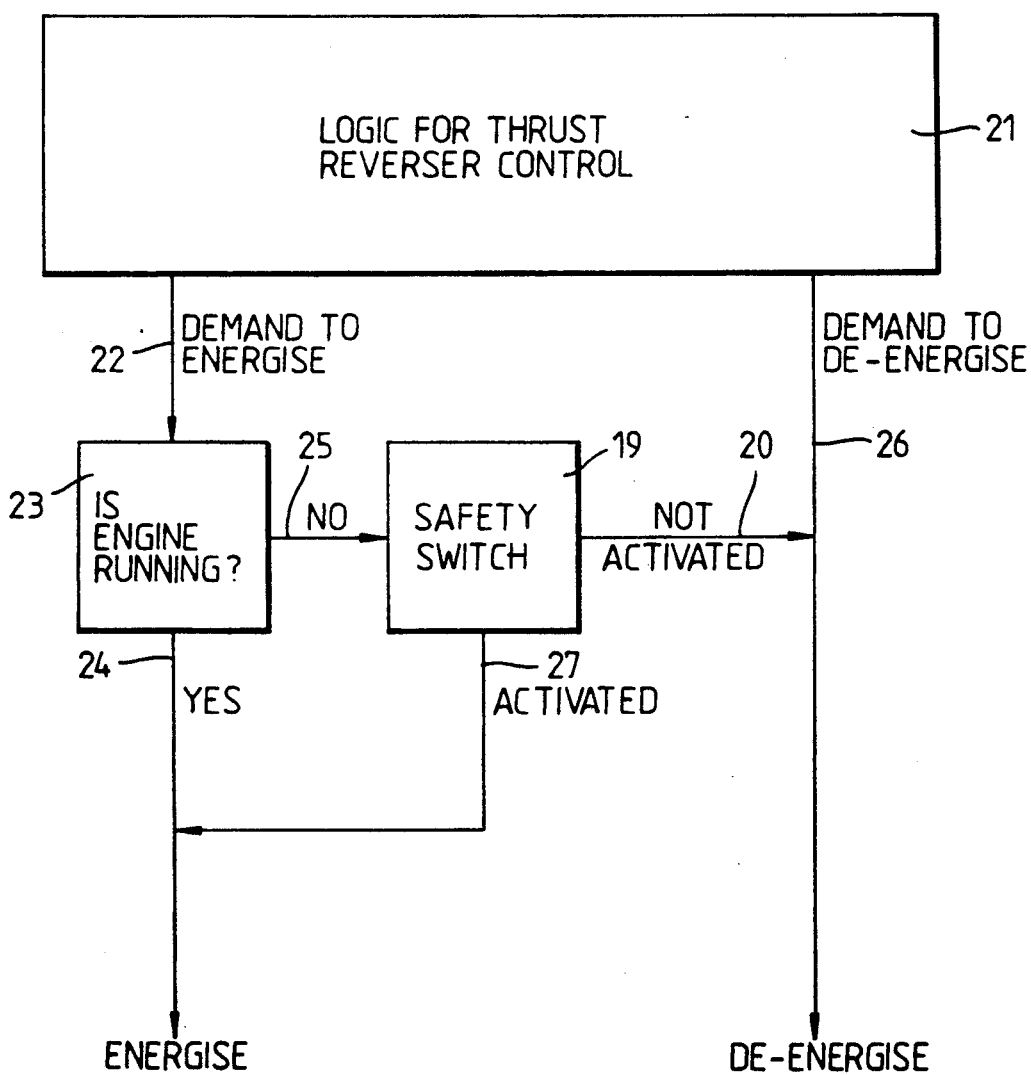

GAS TURBINE ENGINE THRUST REVERSER CONTROL

This invention relates to gas turbine engines having thrust reversers and in particular to the control of such thrust reversers.

It is common practice to provide gas turbine engines for powering aircraft with some form of thrust reversal device. Such devices are adapted to re-direct at least part of the propulsive thrust of the engine so as to assist aircraft retardation after landing. Typically such thrust reversers are constituted by large gas flow controlling members which move rapidly from non-deployed to deployed positions.

During aircraft maintenance it is necessary to carry out certain work on the aircrafts' engines and this may or may not include checking of the operation of the engine's thrust reversers. There is a possibility therefore that during such maintenance, the engine thrust reversers could be either deliberately or unintentionally operated. Obviously such operation, involving as it does the rapid translation of large members on the engine's exterior, poses a safety threat to personnel working on the engine.

It is an object of the present invention to provide a thrust reverser control system which reduces the likelihood of inadvertent operation of the thrust reverser.

According to the present invention, a gas turbine engine for use on an aircraft includes a thrust reverser and a control system for controlling the operation of said thrust reverser, said control system having as an input, a signal representative of a command to select thrust reverser operation and as output, a signal dependent upon said input signal which provides thrust reverser operation, said control system including means reactive to both said command to select thrust reverser operation and to the running or non-running of said gas turbine engine, said reactive means being adapted to provide one of first and second output signals, each of which is representative of said command to select thrust reverser operation, the outputting of said first signal being dependent upon the running of said gas turbine engine and the outputting of said second signal being dependent upon the non-running of said gas turbine engine, said first signal constituting said control system output to provide the selection of thrust reverser operation and said second signal being directed to manually operable means located on the exterior of said gas turbine engine remote from said thrust reverser, said manually operable means causing said second signal to be directed to constitute said control system output to provide thrust reverser operation only during the time said manually operable means is being manually operated.

The invention will now be described, by way of example, with reference to the accompanying drawings in which:

FIG. 2 is a schematic logic diagram of a control system for use in the operation of the thrust reverser of the gas turbine engine shown in FIG. 1.

Figure 1:
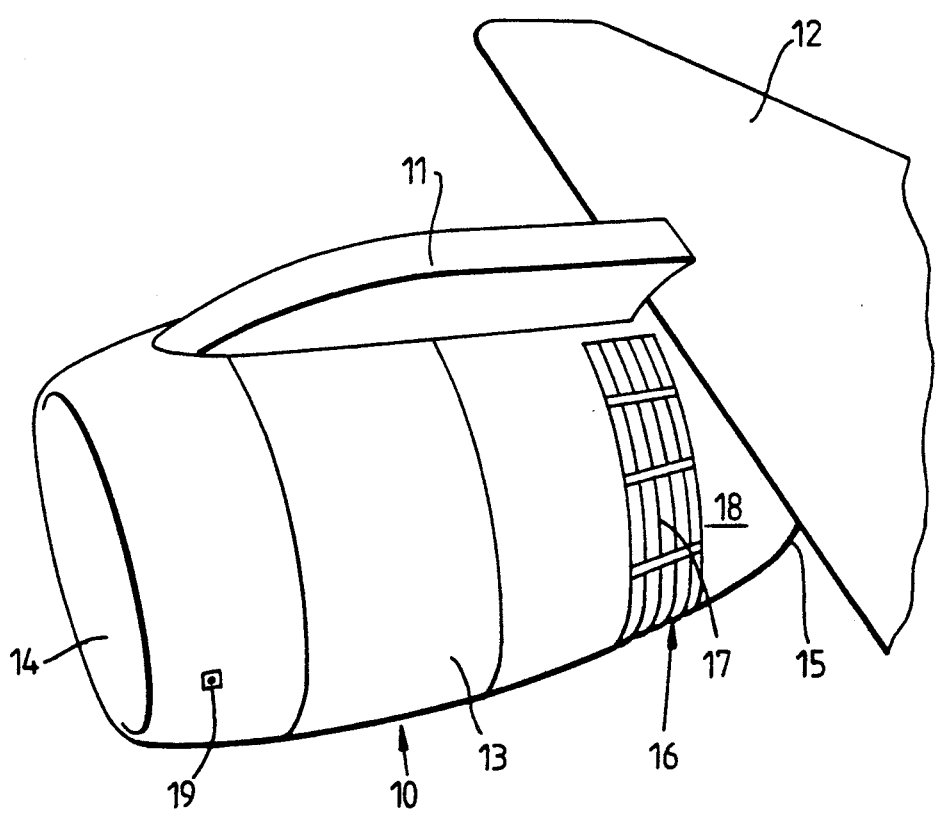
FIG. 1 is a perspective view of a part of an aircraft wing having a gas turbine engine in accordance with the present invention mounted thereon.

With reference to FIG. 1, a ducted fan gas turbine engine 10 is mounted by means of a pylon 11 from the wing 12 of an aircraft (not shown). The gas turbine engine 10 is of conventional construction having an outer aerodynamic cowling 13, an air intake 14 and an exhaust nozzle 15.

The gas turbine engine 10 incorporates a thrust reverser 16 which, when deployed, is intended to redirect some of the exhaust efflux of the engine 10 so as to provide a certain degree of braking for the aircraft on which it is mounted. In the case of the gas turbine engine 10 of the present invention, the thrust reverser 16 comprises an array of fan air flow directing cascades 17 although it will be appreciated that other types of thrust reverser could be employed if so desired. The cascades are deployed by the rearward translation of a protective cowling 18 and the blocking by means not shown of the fan air flow duct (not shown) within the engine 10. The thrust reverser 10 is shown in the deployed, thrust reversing configuration in FIG. 1.

When maintenance work is required to be carried out on the engine 10, there is a possibility that injury could be caused to personnel working close to the thrust reverser 16 should the thrust reverser 16 be inadvertently operated.

One way of avoiding the danger of injury, could be to provide a control system for the operation of the thrust reverser 16 which does not permit thrust reverser operation unless the gas turbine engine 10 is running. However this would preclude the testing of the operation of the thrust reverser 16 when the gas turbine engine 10 is not running.

In order to obviate the difficulties and dangers associated with providing a thrust reverser 16 which is capable of operation when the gas turbine engine 10 is not running, a safety switch 19 is provided on the engine cowling 13 close to the engine air intake 14. The safety switch 19 forms a part of the control system for the operation of the thrust reverser 16 and is of the type which is activated only while being manually operated. It may therefore be of the spring-loaded button type so that when it is not being manually operated, it defaults to a non-activated state.

When it is desired to test the operation of the thrust reverser when the gas turbine engine 10 is not running, the safety switch 19 is manually activated at the same time that the main thrust reverser switch in the aircraft cockpit is operated. Typically the main thrust reverser switch is operated automatically by the operation of the aircraft throttle levers. This results in the operation of the thrust reverser 16.

It will be seen therefore that since the safety switch 19 is mounted on the engine cowling 13 and that thrust reverser 16 operation is not possible without manual activation of that safety switch 19, the likelihood of unintentional thrust reverser 16 operation is substantially reduced. Moreover the positioning of the safety switch 16 at the opposite end of the gas turbine engine 10 to the thrust reverser 16 ensures that the person activating the safety switch 19 is safely remote from the thrust reverser 16.

The manner in which the safety switch 19 is integrated into the control system for the thrust reverser 16 can be seen if reference is now made to FIG. 2.

The main logic circuitry 21 for controlling thrust reverser operation monitors the status of the main thrust reverser switch in the aircraft cockpit. This circuitry inter alia determines whether a solenoid valve which controls the hydraulic system of the thrust reverser 16 is energized or de-energized. Essentially if the solenoid valve is energized, the hydraulic system is operational and so thrust reverser operation can occur. However if the solenoid valve is not energized, thrust reverser operation cannot occur.

If there is no command from the cockpit thrust reverser switch to operate the thrust reverser, the main logic circuitry 21 provides an output signal 26 to deenergize the thrust reverser solenoid valve.

If there is a command from the cockpit thrust reverser switch for the operation of the thrust reverser 16, an output signal 22 to energize the solenoid valve results and this is directed to a reactive device 23. The reactive device 23 is adapted to monitor an operating parameter of the gas turbine engine 10 in order to sense whether the engine 10 is running. For instance, the speed of rotation of one or more of the main engine shafts could be monitored or alternatively the gas pressure within a specific region of the engine. Care must be taken however to ensure that a spurious indication of engine running is not obtained as a result of, for instance, the engine "windmilling" as a result of wind blowing through it.

The reactive device 23 provides two outputs 24 and 25 depending on whether the gas turbine engine 10 is running or not running respectively. If the gas turbine engine 10 is running, the output 24 is directed to cause energizing of the solenoid valve which controls the hydraulic actuation system of the thrust reverser 16. The thrust reverser 16 is thus caused to be operated.

If the gas turbine engine 10 is not running, the output 25 is directed to the safety switch 19. If the safety switch 19 is being manually activated its output 27 is directed to cause energizing of the solenoid valve which controls the hydraulic system of the thrust reverser 16, thereby causing the thrust reverser 16 to be operated. However if the safety switch 19 is not manually activated a signal 20 is sent to de-energize the solenoid valve and so thrust reverser operation does not occur.

Although the present invention has been described with reference to the control of a thrust reverser which acts upon the cool fan air exhaust of a gas turbine engine, it will be appreciated that it is also applicable to the control of thrust reversers acting upon the hot gas exhaust exhaust of gas turbine engines.

Throughout this specification, reference to thrust reverser operation includes both the deployment of a thrust reverser to an operational position from a stowed position and the withdrawal of the thrust reverser from the operational position to the stowed position.

I claim:

1. A gas turbine engine for use on an aircraft, said gas turbine engine including a thrust reverser and a control system for controlling the operation of said thrust reverser, said control system having as an input, a signal representative of a command to select thrust reverser operation, and as an output, a signal dependent upon said input signal which provides thrust reverser operation, said control system including means reactive to both said command to select thrust reverser operation and to the running or non-running of said gas turbine engine, said reactive means being adapted to provide one of first and second output signals, each of which is representative of said command to select thrust reverser operation, the outputting of said first signal being dependent upon the running of said gas turbine engine and the outputting of said second signal being dependent upon the non-running of said gas turbine engine, said first signal constituting said control system output to provide the selection of thrust reverser operation said second signal being directed to manually operable means located on the exterior of said gas turbine engine remote from said thrust reverser, said manually operable means causing said second signal to be directed to constitute said control system output to provide thrust reverser operation only during the time said manually operable means is being manually operated.

2. A gas turbine engine as claimed in claim 1 wherein said engine is of the ducted fan type, said thrust reverser being adapted, when deployed, to deflect the fan exhaust air of the engine.

3. A gas turbine engine as claimed in claim 1 wherein said reactive means is reactive to the running or non-running of said engine by monitoring the speed of rotation of at least one of the main shafts of said engine.

4. A gas turbine engine as claimed in claim 1 wherein said manually operable means is situated adjacent the air intake of said engine.

5. A gas turbine engine as claimed in claim 4 wherein said manually operable means is of the spring-loaded button type which defaults to a non-activated state when not being manually operated.

* * * * *